UNITED STATES PATENT OFFICE.

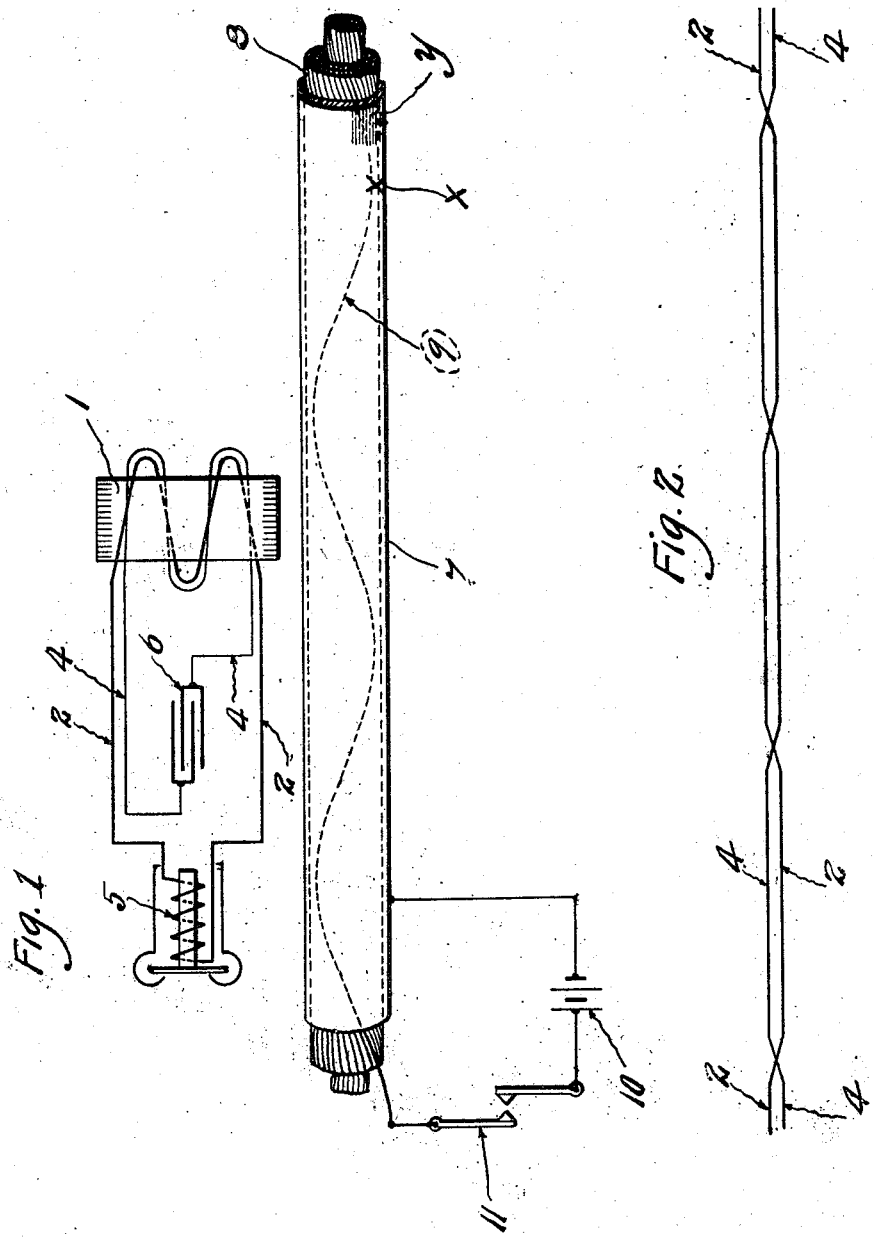

OSCAR F. TALLMAN, OF ST. LOUIS, MISSOURI, ASSIGNOR, BY MESNE ASSIGNMENTS, TO W. N. MATTHEWS AND BROTHER, INCORPORATED, OF ST. LOUIS, MISSOURI, A CORPORATION OF NEW MEXICO.

INSPECTING INSTRUMENT.

1,174,200.   Specification of Letters Patent.   Patented Mar. 7, 1916.

Application filed April 11, 1914. Serial No. 831,256.

*To all whom it may concern:*

Be it known that I, OSCAR F. TALLMAN, a citizen of the United States, residing at the city of St. Louis, State of Missouri, have invented a certain new and useful Improvement in Inspecting Instruments, of which the following is a full, clear, and exact description, such as will enable others skilled in the art to which it appertains to make and use the same, reference being had to the accompanying drawings, forming part of this specification, in which—

Figure 1 is a diagram illustrating the construction of my improved inspecting instrument and a method of its use. Fig. 2 is a diagrammatic illustration of the manner in which the windings of the coil are transposed.

My invention relates to the inspection of electrical conductors, particularly telephone cable conductors, for the purpose of detecting faults therein, such as may be caused by short-circuiting, grounding, or the presence of wet spots in the cable. It will be understood that the usual method employed in locating such a fault in a hidden conductor consists in impressing upon the conductor which is in trouble, some form of an interrupted or alternating current of a form differing from the currents to be found in the associated conductors, and then in exploring the cable with some form of detecting instrument. The detecting instrument is influenced by the magnetic field which is induced about the cable by the presence of the current impressed on the conductor, in some fashion such that the presence of such magnetic field may be ascertained by the inspector. It is desirable to keep this test current at as low a value as possible in order to prevent its influencing the lines which are associated with the line under test, as when the test current is of sufficient quantity to affect such other lines, the telephones on such other lines are rendered noisy and the service interfered with. This necessitates the inspecting instrument's being capable of detecting a test current of small quantity. Furthermore, the inspecting instrument must be readily responsive to the characteristic variations of the test current in order that the inspector may distinguish it from the other electrical disturbances which are constantly present in the cable.

It is the purpose of my invention, therefore, to provide an improved form of inspecting instrument which is possessed of a high degree of sensitiveness and responsiveness.

It is likewise an object of my invention to produce such an inspecting instrument which may be manufactured at low cost, which is compact and easy to transport and manipulate, and which can stand the rough usage to which such instruments are subjected.

With these and other objects in view, which will be obvious or hereinafter pointed out, it will be understood by reference to the accompanying drawings that my invention includes a laminated core member 1 which preferably is composed of a bunch of soft iron wires. This core is wound with a duplex winding composed of a wire 2 forming a portion of what I shall term the receiver circuit, and a wire 4 forming a portion of what I shall term the condenser circuit. These wires are wound on the core together, and are transposed across each other at suitable intervals, as diagrammatically illustrated in Fig. 2. The ends of the wire 2 are connected with the terminals of the coil 5 of a polarized telephone receiver, whereby a closed circuit is formed through said coil 5 and about the core 1. A condenser 6 is placed in series in the winding formed by the wire 4.

For the purpose of illustrating the operation of the device, let 7 represent a telephone cable containing the conductors 8, one of which 9 is short-circuited with the cable sheath at some unknown point X.

Let 10 represent any suitable means of current supply, one pole of which may be connected to the cable sheath, and the other pole of which is adapted to be thrown into and out of electrical connection with the conductor 9 by some suitable interrupting device 11. Upon the operation of the interrupting device 11, a pulsating or interrupted current will be impressed on the conductor 9, which current will continue along the conductor 9 to the unknown point of fault at X, from which point it will return along the cable sheath. This will produce a magnetic field about the cable as far as the fault, but no farther, which field will have the particular characteristic produced by the test current. When the wound core of the testing instrument is brought within this field, an E. M. F. and current will be induced in the receiver circuit and the condenser circuit by the transformer action of the field upon the core 1 and the windings thereon. While this current and E. M. F. are present in winding 2, the permanent magnet of the telephone receiver will be deënergized by coil 5, permitting the diaphragm to move away from the magnet. When the coils on the receiver magnet are then deënergized, the diaphragm of the receiver is attracted by the permanent magnet of the receiver. Thus, the diaphragm is caused to vibrate by the alternate energization and deënergization of the coils on the telephone receiver magnet. This is, of course, the well known action of the magnetic telephone.

There are present in the circuit made up of the winding 2 and the telephone receiver coils 5, the usual influences tending to oppose the production of a current in the circuit, and reduce the ultimate effectiveness of the magnetic field about the cable upon the magnet and diaphragm of the telephone receiver. Such influences, of course, are the resistance, the capacity, and the inductance of the windings 2 and 5. Moreover, the core 1, when energized in the field about the cable, tends to retain its magnetism to a greater or less degree after the current in the conductor 9 has been interrupted. The action of core 1, therefore, in this particular upon the coil 2 is to prolong and attenuate the energization of the telephone receiver coils. In this the action of core 1 and coil 2 is that of an impedance coil. This impedance, artificially produced in the receiver coil 5 by core 1, if not counteracted, would act in the usual fashion to prevent immediate deënergization of said coil 5. Hence the diaphragm would not be subjected to the sharply contrasting influences of repulsion and attraction which are necessary to make known to the ear of the operator the presence of the characteristic field about the cable 7. Therefore, the instrument would not have the proper sensitiveness. By the addition of the condenser circuit 4, however, the impeding influence of coil 1 is opposed and counteracted. When current is present in the conductor 9 and the resulting field in existence about the cable 7, a current and E. M. F. will be induced in the winding 4 as in the winding 2. This will operate to charge the condenser 6. Immediately upon the interruption of the current in conductor 9, the condenser 6 will discharge back over the winding 4 in the opposite direction. This will have the effect of damping out of core 1 the residual magnetism which tends to maintain the current in the winding 2 in the original direction. Consequently, the current is permitted to reverse in the receiver coil 5 immediately when the current on conductor 9 is interrupted.

Although I believe the foregoing to be a proper explanation of the action whereby the improved results obtainable with my device are secured, it will be understood that I am not limited to the particular theory of operation.

In some instances, it has been customary in various devices to insert a condenser across the energizing circuit of an electromagnet to counteract the impedance and inductance of the circuit. Such an arrangement in a device of this kind, however, is not effective, for the reason that the condenser increases the capacity of the circuit to such an extent that the effectiveness of the induced current and E. M. F. in the telephone receiver circuit is greatly reduced and consequently, the receiver is not sufficiently sensitive or responsive.

As above stated, the wires 2 and 4 are transposed at suitable intervals, whereby any inductive effect of one upon the other is prevented.

It is obvious that the device is equally suited for the location of wet spots or other faults by which the conductor is grounded, as indicated at "Y", likewise, where two conductors are crossed in the cable in which case the poles of the current producing device are connected on the crossed conductors. It is obvious also that my improvement may be employed in all similar uses wherein a sensitive detecting instrument is required.

The inspecting instrument above described may be embodied in a very compact commercial form which can be easily carried in the pocket of the inspector. By virtue of its simplicity, it is adapted to withstand rough usage, and is constantly ready for use, as no adjustments of any kind are required to operate the same.

Having thus described the construction of my improved inspecting instrument, and what I believe to be the theory of its operation, I am aware that various changes and modifications therein may be made without departing from the scope of what I claim to be my invention.

What I claim is:

1. An inspecting instrument comprising a core member supplied with a winding having included in circuit therewith the coils of a telephone receiver, and a second winding wound on said core with the said winding and having a condenser included in series therewith; said windings being disposed in similar inductive relationship to said core.

2. An inspecting instrument comprising a core member supplied with a winding, an electromagnetic indicating device having its coils included in circuit with said winding, said core being provided with a second winding having a condenser included in series therewith; both of said circuits being in the nature of secondary circuits.

3. An inspecting instrument comprising a portable core member provided with independent windings disposed in similar inductive relationship thereto, one of said windings having connection with an indicating device, and the other of said windings forming part of an induction circuit closed upon itself through a condenser.

4. In an inspecting device, a movable core member, an indicating device, a winding disposed in inductive relationship with the core member and in operative relationship with the indicating device, and a condenser circuit including a condenser and a coil disposed in inductive relationship with the core member; the construction and arrangement of parts being such that the pressure in the condenser circuit is increased as the intensity in the winding is increased.

5. An instrument of the sort described comprising an indicating device, a condenser, a magnetically susceptible core member having similarly associated therewith in secondary inductive relationship a pair of separate circuits, one of which is arranged in operative relationship to the indicating device, and the other of which is closed through the condenser.

6. In a device of the sort described, an indicating device, a condenser, a magnetically susceptible core member, a winding operatively associated with the indicating device and arranged for secondary coöperation with the core, and a second winding arranged for secondary coöperation with the core member and closed through the condenser.

In testimony whereof I hereunto affix my signature in the presence of two witnesses, this 23d day of March, 1914.

OSCAR F. TALLMAN.

Witnesses:
  M. P. SMITH,
  C. S. BUTLER.